(12) United States Patent
Jeon et al.

(10) Patent No.: US 11,949,159 B2
(45) Date of Patent: Apr. 2, 2024

(54) ELECTRONIC DEVICE WITH ANTENNA

(71) Applicant: SAMSUNG ELECTRONICS CO., LTD., Suwon-si (KR)

(72) Inventors: Jaewoong Jeon, Suwon-si (KR);
Yonghyun Yoon, Suwon-si (KR);
Jaewun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 135 days.

(21) Appl. No.: 17/829,026

(22) Filed: May 31, 2022

(65) Prior Publication Data
US 2022/0294118 A1    Sep. 15, 2022

Related U.S. Application Data

(63) Continuation of application No. PCT/KR2021/015854, filed on Nov. 4, 2021.

(30) Foreign Application Priority Data

Nov. 6, 2020 (KR) .......................... 10-2020-0147693

(51) Int. Cl.
*H01Q 13/18* (2006.01)
*H01Q 13/02* (2006.01)

(52) U.S. Cl.
CPC ......... *H01Q 13/18* (2013.01); *H01Q 13/0266* (2013.01)

(58) Field of Classification Search
None
See application file for complete search history.

(56) References Cited

U.S. PATENT DOCUMENTS

| | | | |
|---|---|---|---|
| 10,135,149 B2 | 11/2018 | Zhou | |
| 2015/0201723 A1* | 7/2015 | Rayner | F16M 13/04 224/191 |
| 2018/0123247 A1* | 5/2018 | Bunce | H01Q 21/29 |
| 2019/0371622 A1* | 12/2019 | Kiel | H01L 21/4857 |
| 2022/0209423 A1* | 6/2022 | Goebel | G01S 7/285 |

FOREIGN PATENT DOCUMENTS

| | | |
|---|---|---|
| KR | 10-2013-0118919 | 10/2013 |
| KR | 10-2016-0013947 | 2/2016 |
| KR | 10-2016-0022074 | 2/2016 |
| KR | 10-2019-0090870 | 8/2019 |
| KR | 10-2019-0116883 | 10/2019 |
| KR | 10-2151056 | 9/2020 |
| WO | 01/041257 | 6/2001 |

* cited by examiner

*Primary Examiner* — Wilson Lee
(74) *Attorney, Agent, or Firm* — Nixon & Vanderhye, P.C.

(57) ABSTRACT

An electronic device with an antenna is provided. The electronic device includes: a wireless communication circuit disposed inside the electronic device, a support including a first support disposed on at least a portion of a side surface of the electronic device and a second support forming a space for mounting electronic parts of the electronic device, a metal flange located on a protrusion of the first support and electrically connected to the wireless communication circuit, a slit formed between a portion of the first support and a portion of the second support, and a metal plate connected to the second support to form a cavity around the metal flange.

19 Claims, 25 Drawing Sheets

ELECTRONIC DEVICE WITH ANTENNA

CROSS-REFERENCE TO RELATED APPLICATIONS

This application is a continuation of International Application No. PCT/KR2021/015854 designating the United States, filed on Nov. 4, 2021, in the Korean Intellectual Property Receiving Office and claiming priority to Korean Patent Application No. 10-2020-0147693, filed on Nov. 6, 2020, in the Korean Intellectual Property Office, the disclosures of which are incorporated by reference herein in their entireties.

BACKGROUND

1. Field

The disclosure relates to an electronic device including an antenna.

2. Description of Related Art

An electronic device supporting wireless communication includes an antenna. An electronic device such as a smartphone or a tablet may transmit and receive signals of designated frequency bands, using a metallic material that is arranged in the electronic device or that forms an external appearance of the electronic device as a radiator. In general, although an existing smartphone has a narrow side bezel area, upper and lower bezel areas thereof are relatively wide so that a camera, a receiver, a speaker, a microphone, or a home button may be disposed. Accordingly, antennas for supporting wireless communication such as a cellular network, wireless fidelity (Wi-Fi), or Bluetooth™ are mainly arranged in upper and lower bezel areas in an electronic device such as an existing smartphone.

SUMMARY

According to an example embodiment, an electronic device includes: a wireless communication circuit disposed inside the electronic device; a support including a first support disposed on at least a portion of a side surface of the electronic device and a second support forming a space for mounting electronic parts of the electronic device; a metal flange located on a protrusion of the first support and electrically connected to the wireless communication circuit; a slit formed between a portion of the first support and a portion of the second support; and a metal plate connected to the second support forming a cavity around the metal flange.

The metal plate may be spaced apart from the metal flange and may overlap the metal flange when viewed from a front side of the electronic device.

The metal plate may be integrally formed with the second support.

The metal plate may be connected to one end of the second support and another end of the second support.

One end of the metal plate may be connected to the second support, and another end of the metal plate may be spaced apart from the second support.

The electronic device may further include a circuit board disposed on the second support, and a protection plate configured to protect the circuit board. The metal plate and the protection plate may overlap each other when viewed from the front side of the electronic device.

According to an example embodiment, an electronic device includes: a display panel; a wireless communication circuit disposed inside the electronic device; a support including a first support disposed on at least a portion of a side surface of the electronic device and a second support forming a space for mounting electronic parts of the electronic device; a metal flange located on a protrusion of the first support and electrically connected to the wireless communication circuit; a circuit board disposed on the second support, the circuit board including the wireless communication circuit; and a metal plate enclosing at least a portion of the metal flange together with a portion of the second support.

According to an example embodiment, an electronic device includes: a wireless communication circuit disposed inside the electronic device; a first support disposed on at least a portion of a side surface of the electronic device, the first support including at least one protrusion electrically connected to the wireless communication circuit; a second support forming a space for mounting electronic parts of the electronic device; a slit formed between a portion of the first support and a portion of the second support; and a metal plate connected to the second support to form a cavity around the protrusion.

The metal plate may be configured to prevent and/or reduce (e.g., shield) at least a portion of electromagnetic waves radiated from a feeding slot of the metal flange toward the metal plate from leaking to the outside of the metal plate.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
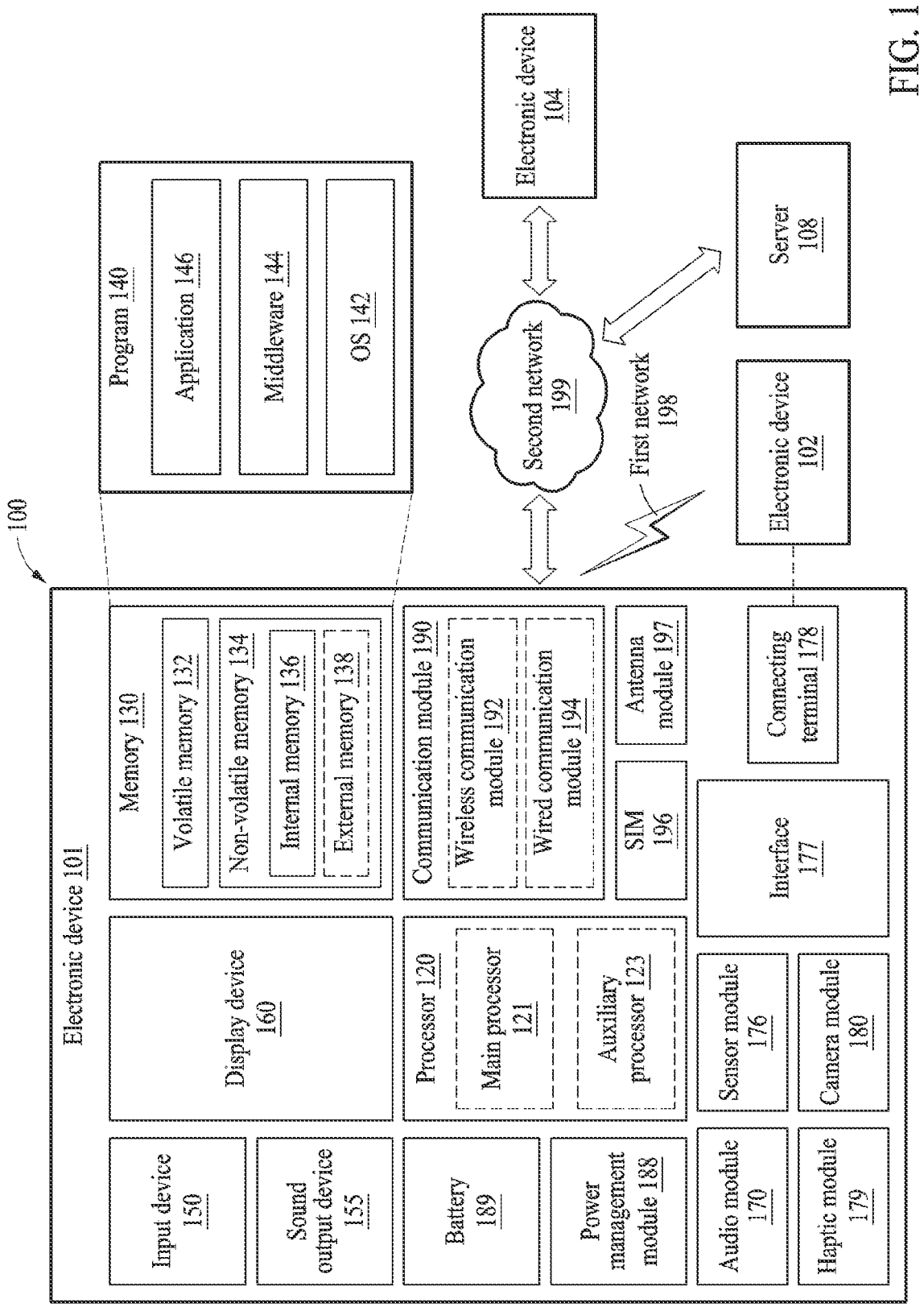
FIG. 1 is a block diagram illustrating an example electronic device in a network environment according to various embodiments.

Hereinafter, various example embodiments will be described in greater detail with reference to the accompanying drawings. When describing the example embodiments with reference to the accompanying drawings, like reference numerals refer to like elements and a repeated description related thereto may not be provided.

FIG. 1 is a block diagram illustrating an example electronic device 101 in a network environment 100 according to various example embodiments. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include any one or any combination of a processor 120, a memory 130, an input device 150, a sound output device 155, a display device 160, an audio module 170, and a sensor module 176, an interface 177, a connecting terminal 178, a haptic module 179, a camera module 180, a power management module 188, a battery 189, a communication module 190, a subscriber identification module (SIM) 196, and an antenna module 197. In various example embodiments, at least one (e.g., the connecting terminal 178) of the above components may be omitted from the electronic device 101, or one or more other components may be added in the electronic device 101. In various example embodiments, some (e.g., the sensor module 176, the camera module 180, or the antenna module 197) of the components may be integrated as a single component (e.g., the display device 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another components (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence model processing. An artificial intelligence model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The artificial intelligence model may additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, a key (e.g., a button), or a digital pen (e.g., a stylus pen).

The sound output device 155 may output a sound signal to the outside of the electronic device 101. The sound output device 155 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display device 160 may visually provide information to the outside (e.g., a user) of the electronic device 101 (e.g., user). The display device 160 may include, for example, a control circuit for controlling a display, a hologram device, or a projector and control circuitry to control a corresponding one of the display, the hologram device, and the projector. According to an example embodiment, the display device 160 may include a touch sensor adapted to sense a touch, or a pressure sensor adapted to measure an intensity of a force incurred by the touch.

The audio module 170 may convert a sound into an electric signal or vice versa. According to an example embodiment, the audio module 170 may obtain the sound via the input device 150 or output the sound via the sound output device 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, image signal processors, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 50 network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include a slit antenna, and/or an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an example embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC, or client-server computing technology may be used, for example. The electronic device 101 may provide ultra low-latency services using, e.g., distributed computing or mobile edge computing. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
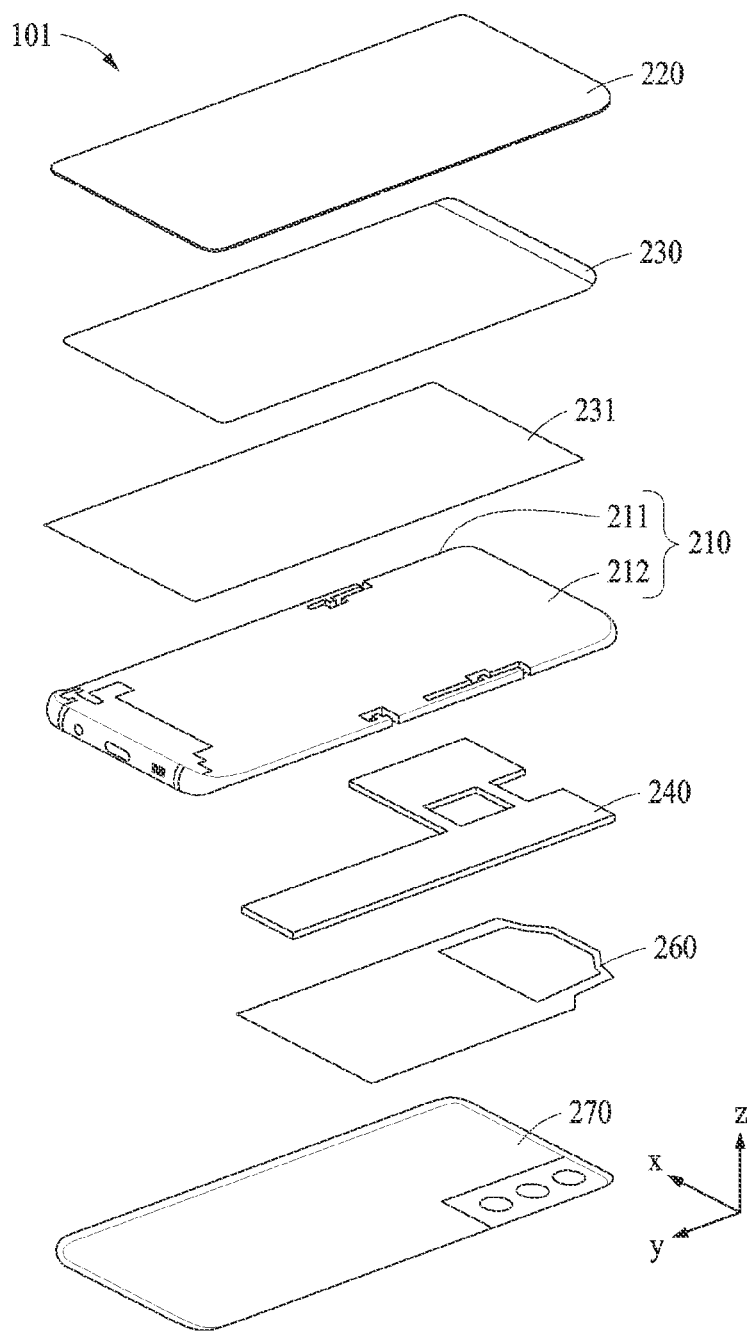
FIG. 2 is an exploded perspective view of an electronic device according to various embodiments.

FIG. 2 is an exploded perspective view of an electronic device according to various embodiments.

Referring to FIG. 2, an electronic device 101 according to an example embodiment may include a window 220, a display panel 230, a conductive sheet 231, a support member (e.g., support) 210, a circuit board 240, a short-range communication circuit 260, and/or a cover 270.

The window 220 may form a front surface of the electronic device 101. The window 220 may be formed by a glass plate or a polymer plate including various coating layers. The display panel 230 (e.g., the display device 160 of FIG. 1) may be disposed under the window 220. At least a portion of the display panel 230 may be visible or viewable through the window 220. The display panel 230 may be connected to a processor (e.g., the processor 120 of FIG. 1) of the electronic device 101. The display panel 230 may receive image data from the processor and display an image based on the image data.

The conductive sheet 231 may be disposed on one surface of the display panel 230. The conductive sheet 231 may function as a ground layer that performs a function of a ground of the display panel 230. The conductive sheet 231 may be implemented as, for example, a metal plate (e.g., a copper (Cu) sheet) or graphite. The conductive sheet 231 may block electromagnetic waves flowing into or out of the display panel 230, and may dissipate heat generated from the display panel 230.

The support member (e.g., support) 210 may include a first support structure (e.g., first support) 211 disposed on at least a portion of a side surface of the electronic device 101, and a second support structure (e.g., second support) 212 that forms a space for mounting electronic parts of the electronic device 101. In an example embodiment, the first support structure 211 may be coupled to the window 220 and the cover 270. The first support structure 211 may be formed of a metal and/or a conductive polymer material. The second support structure 212 may be disposed in an inner space (or a body portion) of the electronic device 101. The second support structure 212 may also be formed of a metal and/or a conductive polymer material. The second support structure 212 may be integrally formed with the first support structure 211, or may be formed separately from the first support structure 211 to be connected to the first support structure 211. In an example embodiment, a circuit board 240 such as a PCB may be disposed on the second support structure 212. The second support structure 212 may be connected to, for example, a ground of the circuit board 240.

According to an example embodiment, a processor (e.g., the processor 120 of FIG. 1) may be disposed on the circuit board 240. The processor may include various processing circuitry including, for example, and without limitation, any one or any combination of a central processing unit (CPU), an application processor (AP), a graphic processing unit (GPU), an ISP, a sensor hub processor, or a communication processor (CP).

According to an example embodiment, a wireless communication circuit (e.g., the wireless communication module 192 of FIG. 1) may be disposed on the circuit board 240. The wireless communication circuit may communicate with, for example, an external device (e.g., the electronic device 104 of FIG. 1). The electronic device 101 may include an antenna (e.g., the antenna module 197 of FIG. 1) disposed on a side thereof, and the wireless communication circuit may generate a signal that is to be transmitted via the antenna. In an example embodiment, the antenna disposed on the side of the electronic device 101 may include a slit antenna. The circuit board 240 may include a ground, and the ground of the circuit board 240 may function as a ground of an antenna implemented using the wireless communication circuit.

The short-range communication circuit 260 may perform short-range communication with an external device (e.g., the electronic device 102 of FIG. 1), or may wirelessly transmit and receive power required for charging. For example, the short-range communication circuit 260 may be implemented as near field communication (NFC) or magnetic secure transmission (MST).

The cover 270 may form a rear surface of the electronic device 101. The cover 270 may protect the electronic device 101 from external impact or foreign materials.

With the development of communication technologies, the electronic device 101 may be required to include antenna structures to perform various wireless communication schemes and wireless communication of various frequency bands. Since the inner space of the electronic device 101 is limited compared to the above requirements, a support structure (e.g., the first support structure 211) disposed on a side of the support member 210, and a support structure (e.g., a metal frame or a metal housing) disposed in an upper end and/or a lower end of the support member 210 may all need to be used as components of an antenna.

Since electronic parts for an operation of a button or a key, and various other electronic parts (e.g., a mmWave module, or power-related electronic parts) are disposed on the side of the support member 210, there may not be enough space to mount the antenna. A slit antenna may be used as an antenna implemented on the side of the support member 210 because the slit antenna occupies a relatively small space and may be designed robustly against power-related electronic parts. The slit antenna may be an antenna that performs wireless communication using a slit corresponding to a gap between two conductors. The slit may include an air gap or may be filled with an insulating material by injection molding. A feeding slot of the slit antenna may be disposed in a metal flange that faces the inside of the electronic device 101.

According to an example embodiment, a metal flange (e.g., a metal flange 510 of FIG. 5) may be formed in the support member 210. For example, the metal flange may be located on a protrusion of a first support structure (e.g., the first support structure 211). For example, the metal flange may be integrally formed with the first support structure.

According to an example embodiment, the feeding slot (e.g., a feeding slot 620 of FIG. 6) of the slit antenna may be a feeding region that is electrically connected to a wireless communication circuit (e.g., the wireless communication module 192 of FIG. 1) of the electronic device 101. For example, the feeding slot of the slit antenna may be a feeding region of a metal flange electrically connected to the wireless communication circuit. For example, the feeding slot of the slit antenna may be integrally formed with the metal flange.

A portion of the slit may be disposed along the metal flange, and a length or a shape of the slit may vary according to frequency characteristics required for wireless communication.

Since a material having a rigidity similar to that of a metal is not included in the slit, the slit may be weak against a force externally applied the slit. When the slit antenna is implemented on a side of the electronic device 101 to which an external force is directly applied, it may be desirable to enhance a mechanical rigidity of the side on which the slit antenna is disposed. The electronic device 101 may include a metal member (e.g., a metal plate) connected to the second support structure 212 while forming a cavity around the metal flange of the slit antenna disposed on the side, which will be further described below. Due to the metal member, both the mechanical rigidity of the side of the electronic device 101 on which the slit antenna is disposed, and performance of the slit antenna may be enhanced.

According to an example embodiment, the cavity formed around the metal flange (e.g., a metal flange 510 of FIG. 5) of the slit antenna disposed on the side of the electronic device 101 may include a hole or a hollow formed between two surfaces. For example, the cavity may include a hole or a hollow formed between a surface of a protrusion (e.g., a metal flange (e.g., the metal flange 510 of FIG. 5)) of the first support structure (e.g., the first support structure 211) and a surface of a metal member (e.g., a metal plate 530 of FIG. 5) connected to the second support structure 212. In an example, the cavity formed around the metal flange of the slit antenna disposed on the side of the electronic device 101 may include an opening on at least one surface thereof. In another example, the cavity formed around the metal flange of the slit antenna disposed on the side of the electronic device 101 may be filled with a non-conductive material (e.g., a dielectric material).

Figure 3:
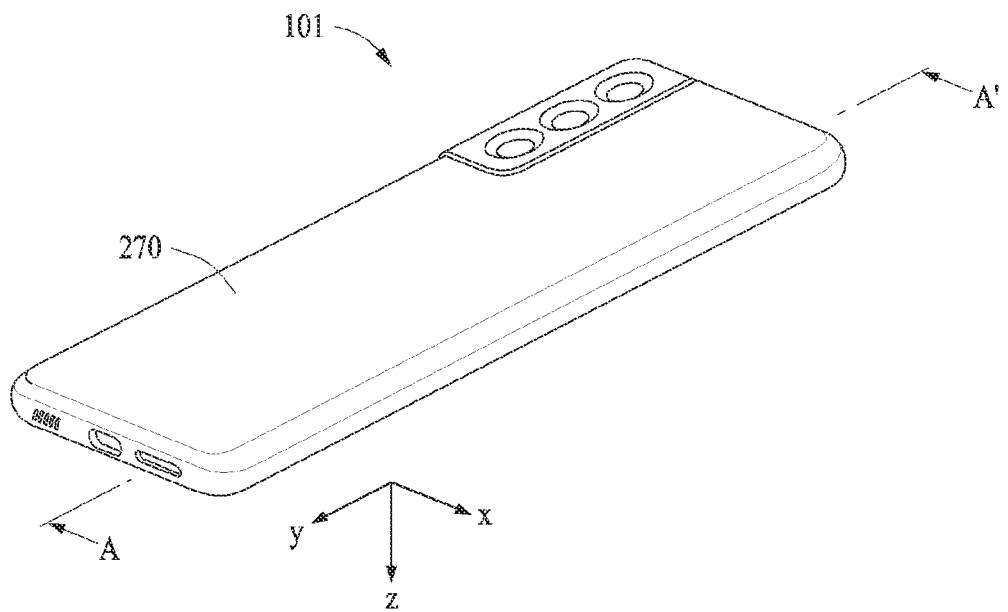
FIG. 3 is a rear perspective view of an electronic device according to various embodiments.
Figure 4:
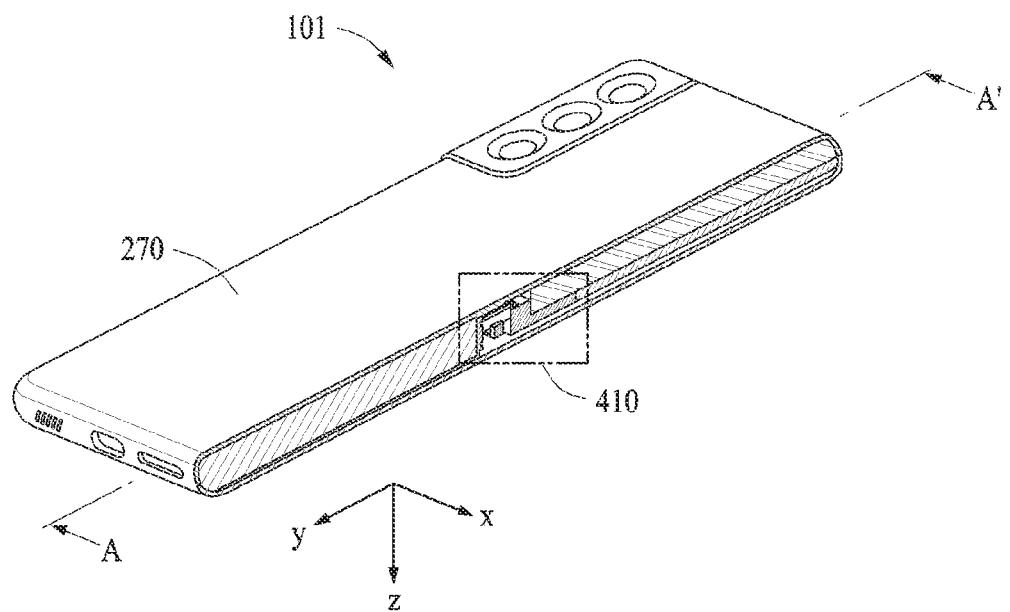
FIG. 4 is a cross-sectional view of an electronic device, taken along line A-A' of FIG. 3 according to various embodiments.
Figure 5:
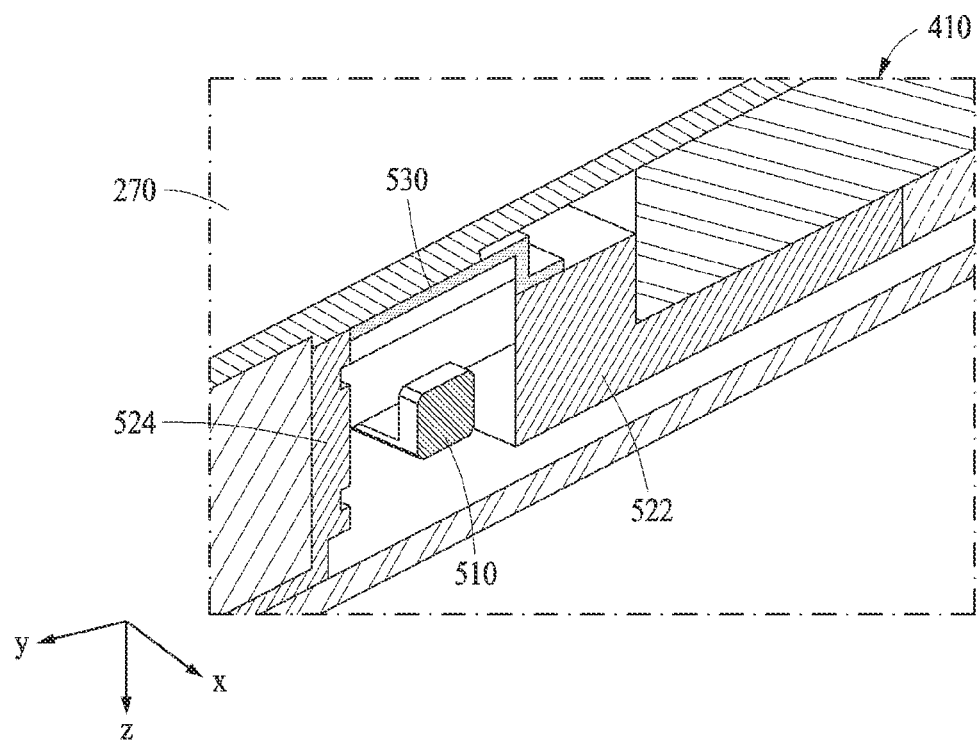
FIG. 5 is an enlarged perspective view of a region of FIG. 4 according to various embodiments.
Figure 6:
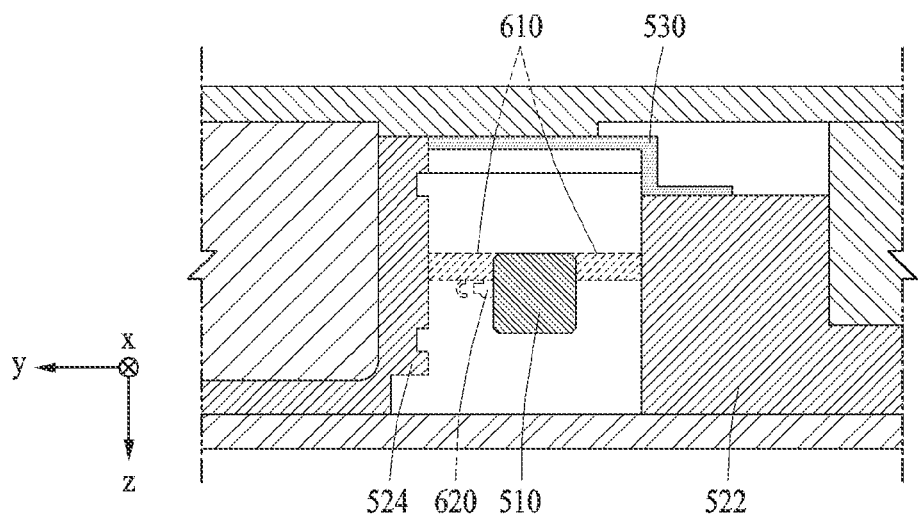
FIG. 6 is a cross-sectional view of the region of FIG. 4 according to various embodiments.

FIG. 3 is a rear perspective view illustrating a rear surface of an electronic device according to various embodiments, and FIG. 4 is a cross-sectional view of an electronic device, taken along line A-A' of FIG. 3 according to various embodiments. FIG. 5 is an enlarged perspective view of a region 410 of FIG. 4 according to various embodiments, and FIG. 6 is a cross-sectional view of the region 410 according to various embodiments.

Referring to FIGS. 3, 4, 5 and 6, a slit antenna may be implemented on an inner side surface of the electronic device 101. The slit antenna may include a support member (e.g., the support member 210 of FIG. 2), the metal flange 510, and the metal plate 530. The support member may correspond to, for example, a metal housing, and at least a portion of a side of the support member may be used for the slit antenna. A slit may be formed inside the support member, and electromagnetic waves for wireless communication may be radiated based on the slit. The feeding slot 620 connected to a wireless communication circuit (e.g., the wireless communication module 192 of FIG. 1) may be disposed on the metal flange 510. The feeding slot 620 may be fed through a contact via a C-clip, for example, and may be disposed on a circuit board 610 (e.g., the circuit board 240 of FIG. 2). The metal plate 530 may be spaced apart from the metal flange 510 and may be connected to at least one of one end 522 and another end 524 of the support member. A cavity structure may be present around the metal flange 510. The metal plate 530 may enclose at least a portion of the metal flange 510 together with the one end 522 and the other end 524 of the support member to form a cavity.

Figure 7:
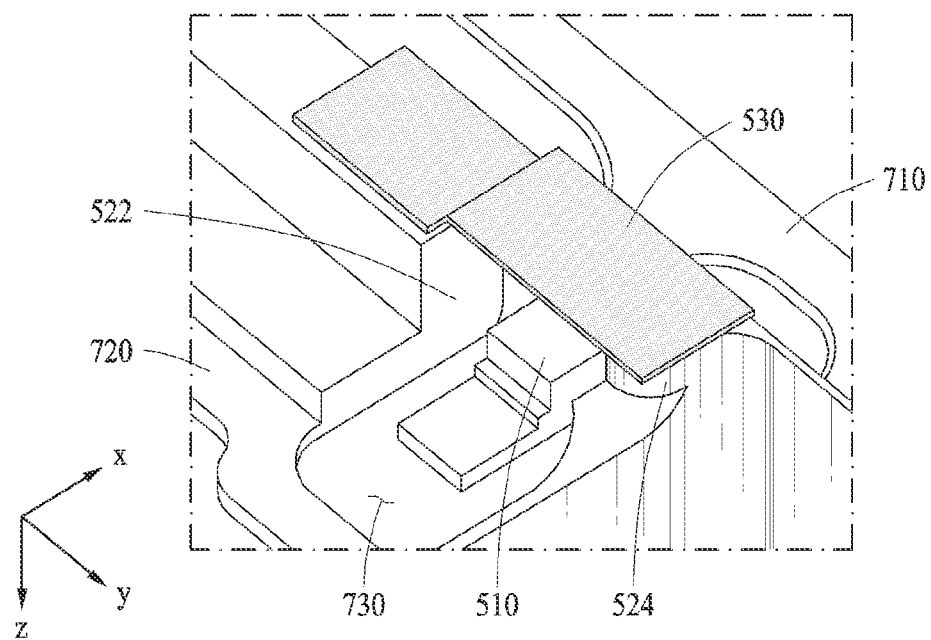
FIG. 7 is a perspective view illustrating an example structure of an antenna according to various embodiments.

FIG. 7 is a perspective view illustrating an example structure of an antenna according to various embodiments.

Referring to FIG. 7, a peripheral structure of a metal flange 510 and a metal plate 530 as a portion of an antenna (e.g., a slit antenna) is illustrated. A support member (e.g., the support member 210 of FIG. 2) may include a first support structure 710 disposed on at least a portion of a side surface of the electronic device 101, and a second support structure 720 that forms a space for mounting electronic parts of the electronic device 101 and supports the inside of the electronic device 101. The first support structure 710 may include a protrusion protruding inward from the electronic device 101, and the metal flange 510 may be located on the protrusion. A feeding slot (e.g., the feeding slot 620 of FIG. 6) may be disposed on the metal flange 510. A slit 730 may be formed between a portion of the first support structure 710 and a portion of the second support structure 720. The slit 730 may be formed between the first support structure 710 and the second support structure 720, and between the protrusion of the first support structure 710 and the second support structure 720. The slit 730 may be an air gap or may be filled with an insulating material. Multiple resonances of different resonance frequencies may occur through the slit 730. At least a portion of the second support structure 720 may be disposed along at least a portion of the first support structure 710 and may be spaced apart from the first support structure 710, with the slit 730 interposed therebetween.

The metal plate 530 may enclose at least a portion of the metal flange 510 together with a portion of the second support structure 720. The metal plate 530 may be integrally formed with the second support structure 720, or may be formed separately from the second support structure 720 to be connected to the second support structure 720. When the metal plate 530 is separately formed, the metal plate 530 may be connected to at least a portion of the second support structure 720 to form a cavity around the metal flange 510. The metal plate 530 may be connected to at least one of one end 522 and another end 524 of the second support structure 720. In an example, the metal plate 530 may be connected to both the one end 522 and the other end 524 of the second support structure 720. In another example, one end of the metal plate 530 may be connected to the second support structure 720, and another end of the metal plate 530 may be spaced apart from the second support structure 720. The metal plate 530 may be fixed to the second support structure 720 by a fixing member such as a screw. The metal flange 510 may be located between the one end 522 and the other end 524 of the second support structure 720. The metal plate 530 may be spaced apart from the metal flange 510 and may overlap the metal flange 510 in one direction (e.g., a z-axis direction, or a direction oriented from the front side of the electronic device 101).

As described above, by disposing the metal plate 530, a mechanical rigidity between the one end 522 and the other end 524 of the second support structure 720 may be enhanced, which may lead to an increase in the overall rigidity of the side surface of the electronic device 101. In addition, performance of the antenna may be further enhanced by the metal plate 530, which will be described in greater detail below.

Figure 8:
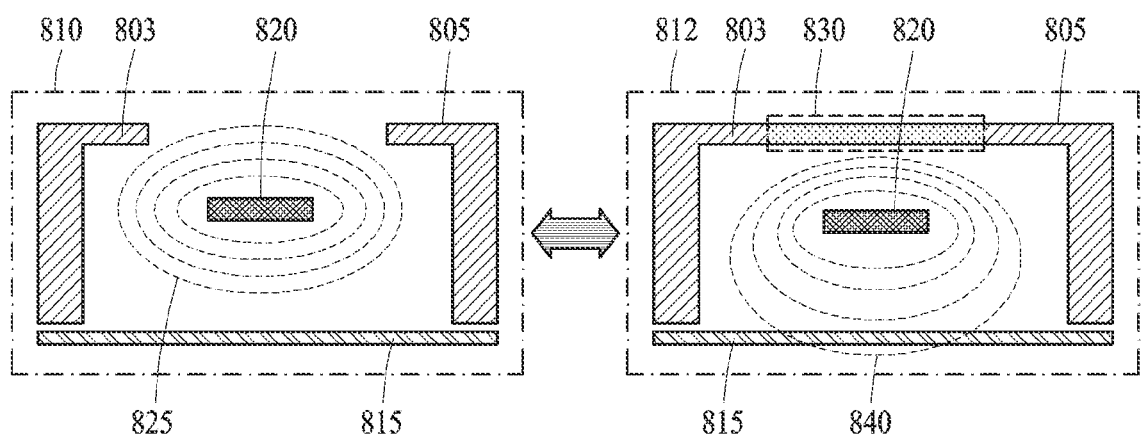
FIGS. 8, 9, and 10 are diagrams illustrating effects of a metal plate on performance of an antenna according to various embodiments.
Figure 9:
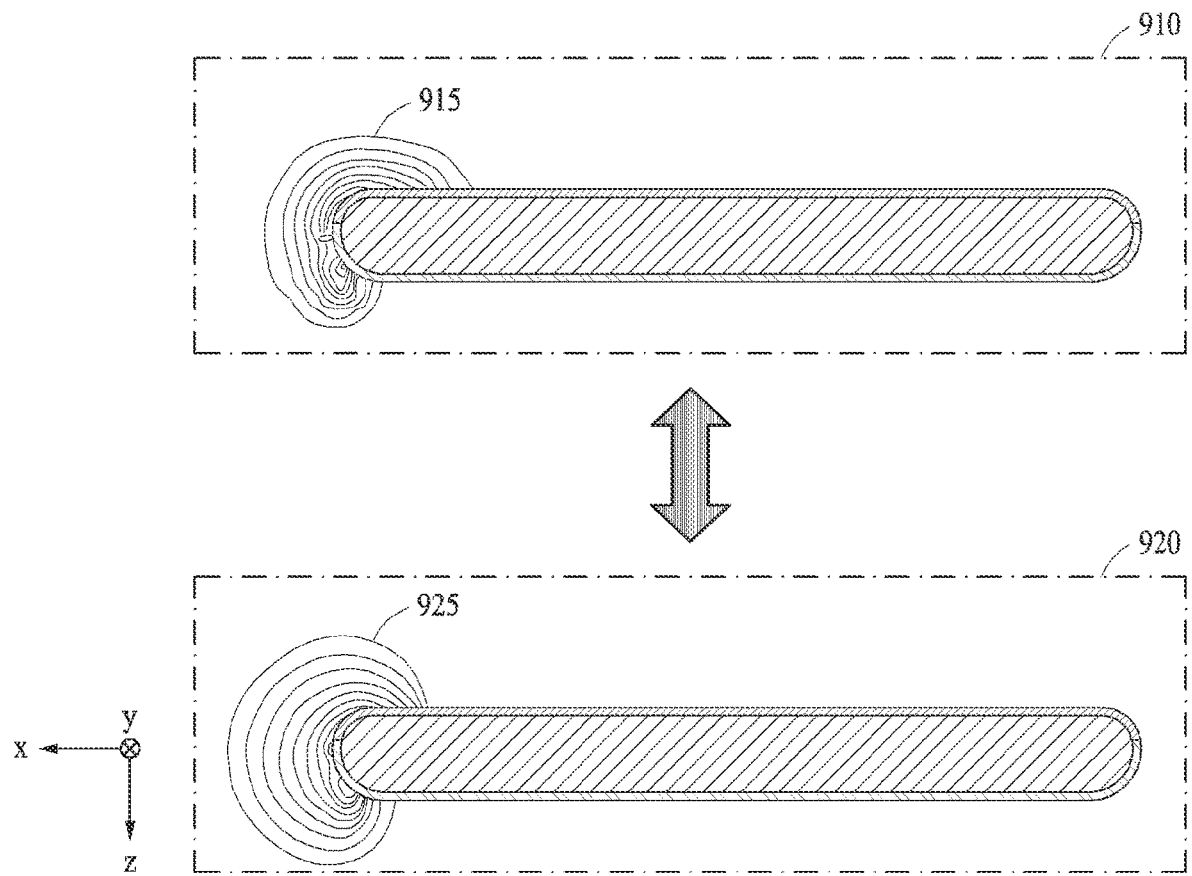
Figure 10:
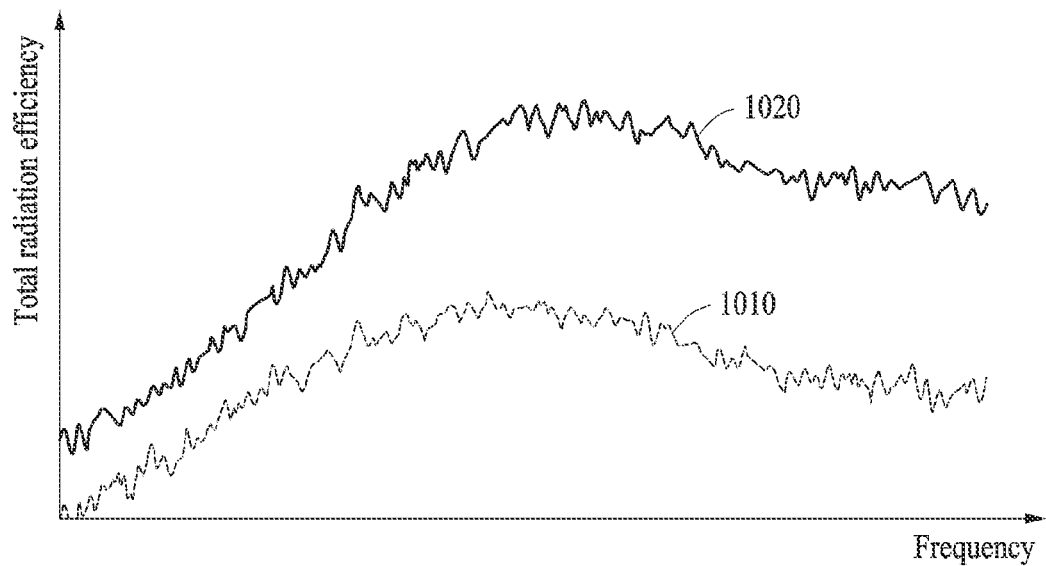

FIGS. 8, 9, and 10 are diagrams illustrating various effects of a metal plate on performance of an antenna according to various embodiments.

Referring to FIG. 8, an antenna structure 810 does not include a metal plate 830, and an antenna structure 812 includes the metal plate 830 (e.g., the metal plate 530 of FIG. 7). The antenna structures 810 and 812 may commonly include a display panel 815, a feeding slot 820, and one end 803 and another end 805 of a second support structure.

In the antenna structure 810, electromagnetic waves 825 may be radiated from the feeding slot 820, and a portion of the electromagnetic waves 825 may leak to the top of the feeding slot 820 because a space between the one end 803 and the other end 805 is open. Due to such leakage of the electromagnetic waves 825, an electromagnetic field for wireless communication may not be sufficiently formed. On the other hand, in the antenna structure 812, when the metal plate 830, which is connected to the one end 803 and the other end 805 of the second support structure above the feeding slot 820 to form a cavity with a metal structure around the feeding slot 820, is disposed, electromagnetic waves 840 radiated from the feeding slot 820 may be concentrated and propagated in a specific direction, thereby further enhancing a radiation efficiency of the antenna. Thus, the metal plate 830 may increase the radiation efficiency of the antenna by preventing and/or reducing (e.g., shielding) at least a portion of electromagnetic waves radiated from the feeding slot 820 of a metal flange toward the metal plate 830 from leaking to the outside of the metal plate 830.

FIG. 9 is a diagram illustrating a simulation result 910 for an electromagnetic field 915 of a side antenna of an electronic device viewed in a y-axis direction when the electronic device has the antenna structure 810 without the metal plate 830, and a simulation result 920 for an electromagnetic field 925 of the side antenna of the electronic device viewed in the y-axis direction when the electronic device has the antenna structure 812 with the cavity formed by the metal plate 830. By comparing the simulation results of 910 and 920, it may be found that the antenna structure 812 including the metal plate 830 generates an electromagnetic field with a further enhanced strength in comparison to the antenna structure 810 without the metal plate 830.

Referring to FIG. 10, a graph 1010 shows a change in a total radiation efficiency of the antenna according to a frequency, when an electronic device has an antenna structure without the metal plate 830 as shown in the antenna structure 810. A graph 1020 shows a change in the total radiation efficiency of the antenna according to the frequency, when the electronic device has an antenna structure with a cavity formed by the metal plate 830 as shown in the antenna structure 812. By comparing the graphs 1010 and 1020, it may be found that the total radiation efficiency of the antenna is enhanced in a wide frequency range when the metal plate 830 is disposed in comparison to when the metal plate 830 is absent.

As described above, a cavity structure may be implemented by the metal plate 830 around a metal flange in which a feeding slot of an antenna disposed on a side surface of the electronic device is located, and thus it may be possible to enhance both the performance of the antenna and the mechanical rigidity of the electronic device.

Figure 11:
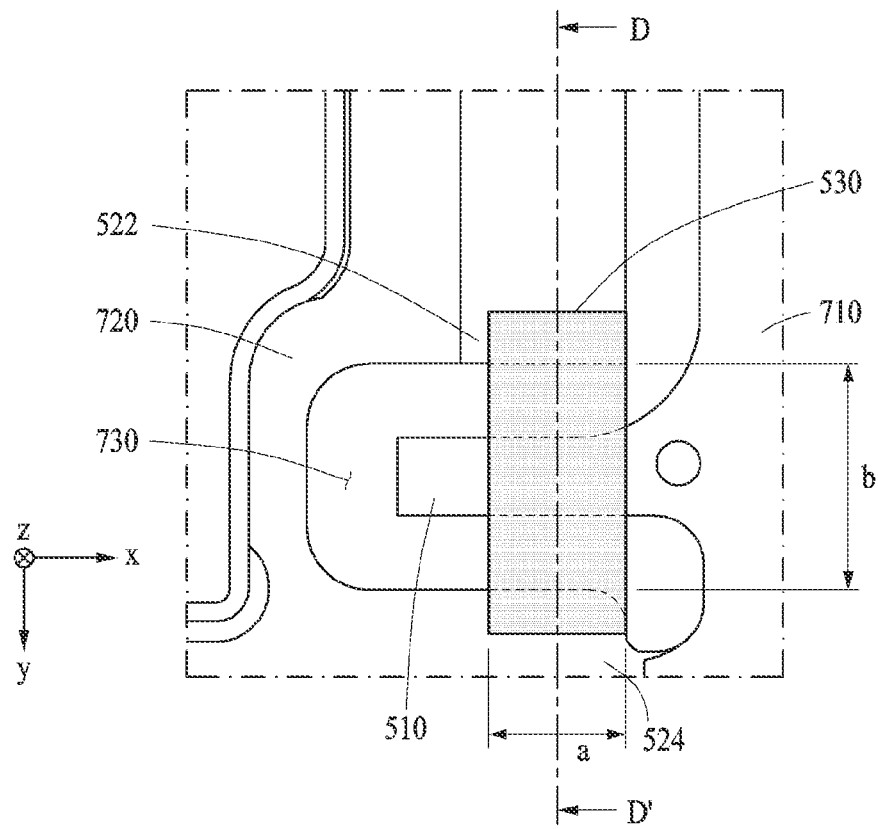
FIG. 11 is a diagram illustrating an example antenna structure of an electronic device, as viewed in a z-axis direction according to various embodiments.

FIG. 11 is a diagram illustrating an example antenna structure of an electronic device, as viewed in a z-axis direction according to various embodiments.

Referring to FIG. 11, the metal flange 510 and the metal plate 530 may overlap each other when viewed from the front side of the electronic device 101, and a resonant frequency of the antenna may change according to a width a of an overlapping area between the metal flange 510 and the metal plate 530. The resonant frequency of the antenna may change according to a length b corresponding to the cavity formed by the metal plate 530.

Figure 12:
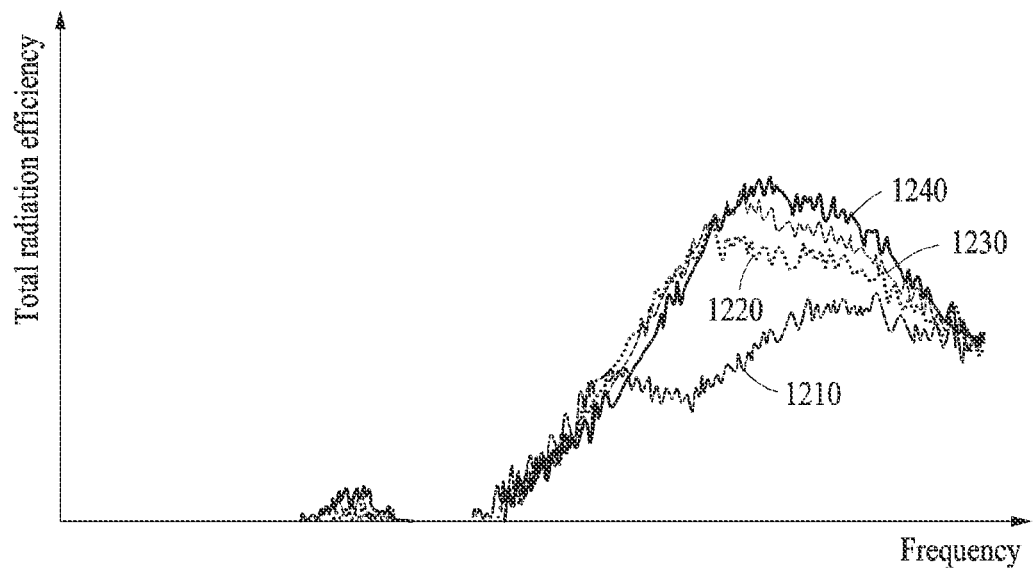
FIG. 12 is a graph illustrating a change in performance of an antenna according to a width of an overlapping area between a metal plate and a metal flange according to various embodiments.

FIG. 12 is a graph illustrating a change in performance of the antenna according to the width a of the overlapping area between the metal flange 510 and the metal plate 530 according to various embodiments. Graphs 1210, 1220, 1230, and 1240 show simulation results for changes in the total radiation efficiency of the antenna according to the frequency at different widths a. The graph 1210 may correspond to a case in which the width a is "0", that is, in which the metal plate 530 is not disposed, and the graph 1220 may correspond to a case in which the width a is 3.5 mm. The graph 1230 may correspond to a case in which the width a is 3.0 mm, and the graph 1240 may correspond to a case in which the width a is 2.5 mm. Here, numerical values of the width a merely correspond to examples for simulation and should not be construed as limiting the scope of the example embodiments or the disclosure.

From the simulation results, it may be found that the total radiation efficiency of the antenna is enhanced regardless of the width a when the metal plate 530 is disposed in comparison to when the metal plate 530 is not disposed. In addition, it may be found that a resonant frequency of the antenna in a high-frequency band changes according to the width a. Thus, in designing a slit antenna, it may be possible to tune the resonant frequency through a shift of the resonance frequency by adjusting the width a of the overlapping area between the metal flange 510 and the metal plate 530. The resonant frequency may be shifted according to the length b corresponding to the cavity formed by the metal plate 530 as well as the width a, and thus it may be possible to tune the resonant frequency by adjusting the length b in the designing the slit antenna.

Figure 13:
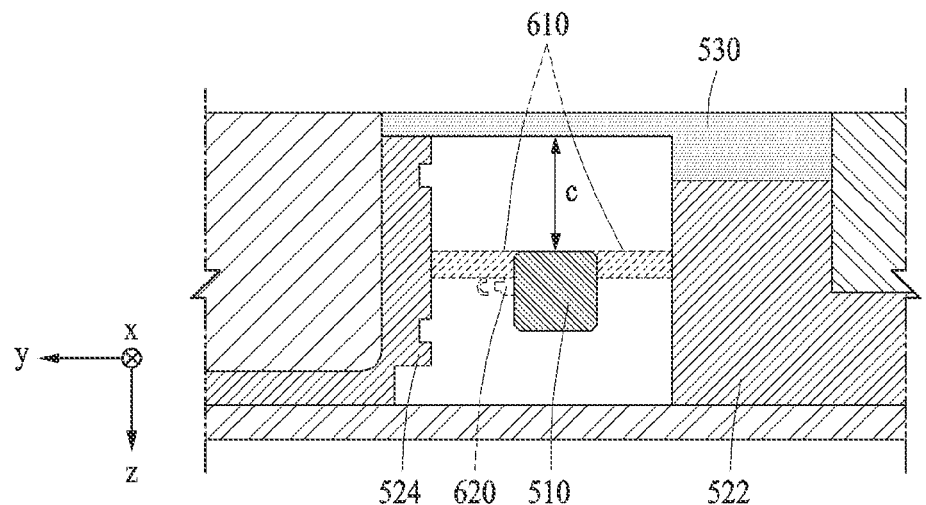
FIG. 13 is a cross-sectional view of the antenna structure of FIG. 11, taken along line D-D' of FIG. 11 according to various embodiments.

FIG. 13 is a cross-sectional view of the antenna structure of FIG. 11, taken along line D-D' of FIG. 11 according to various embodiments. Referring to FIG. 13, the metal plate 530 may be connected to the one end 522 and the other end 524 of the second support structure 720, and a cavity may be formed around the metal flange 510. The metal flange 510 and the metal plate 530 may be spaced apart from each other by a separation distance c. The separation distance c may correspond to a height of the cavity formed based on the metal plate 530. The resonance frequency and the total radiation efficiency of the antenna may change according to the separation distance c.

Figure 14:
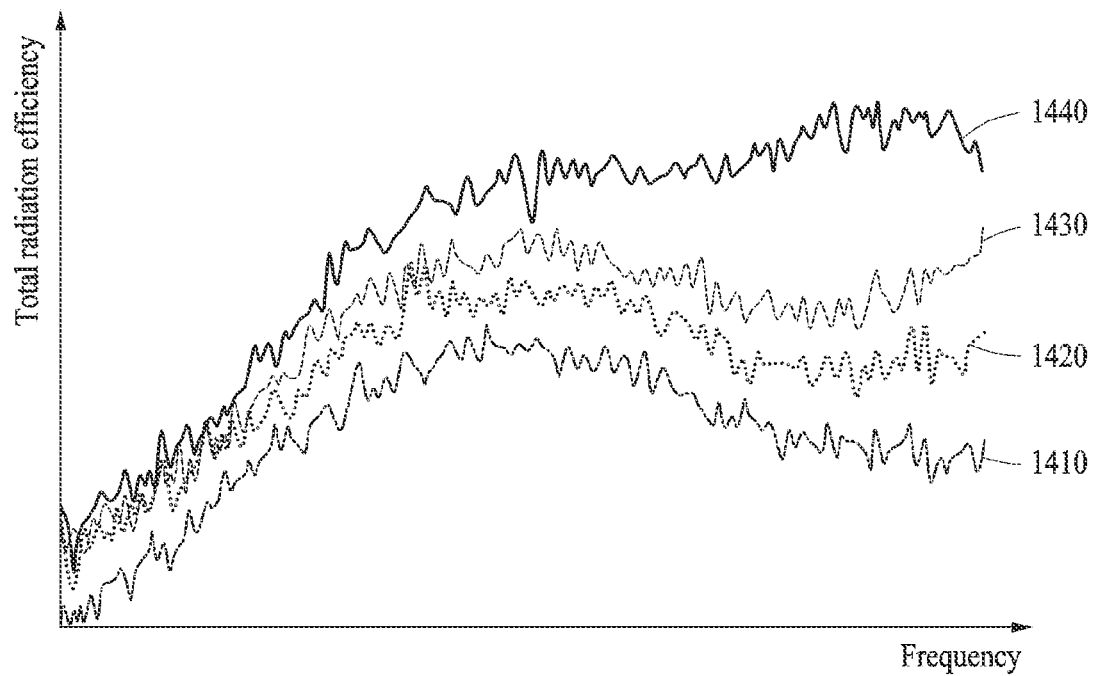
FIG. 14 is a graph illustrating a change in performance of an antenna according to a separation distance between a metal flange and a metal plate according to various embodiments.

FIG. 14 is a graph illustrating a change in the performance of the antenna according to the separation distance c according to various embodiments. Referring to FIG. 14, simulation results for changes in the total radiation efficiency of the antenna according to different separation distances c when the width a and the length b of the metal plate 530 are fixed are illustrated. A graph 1410 may correspond to a case in which the metal plate 530 is not disposed, and a graph 1420 may correspond to a case in which the separation distance c is 1.8 mm. A graph 1430 may correspond to a case in which the separation distance c is 2.3 mm, and a graph 1440 may correspond to a case in which the separation distance c is 2.8 mm. Here, numerical values of the separation distance c merely correspond to examples for simulation and should not be construed as limiting the scope of the example embodiments or the disclosure.

From the simulation results, it may be found that the total radiation efficiency of the antenna is enhanced regardless of the separation distance c when the metal plate 530 is disposed, in comparison to when the metal plate 530 is not disposed. In addition, it may be found that a gain and the resonance frequency of the antenna change according to the separation distance c. In designing a slit antenna, it may be possible to tune the gain as well as the resonance frequency of the antenna by adjusting the separation distance c between the metal flange 510 and the metal plate 530.

Figure 15:
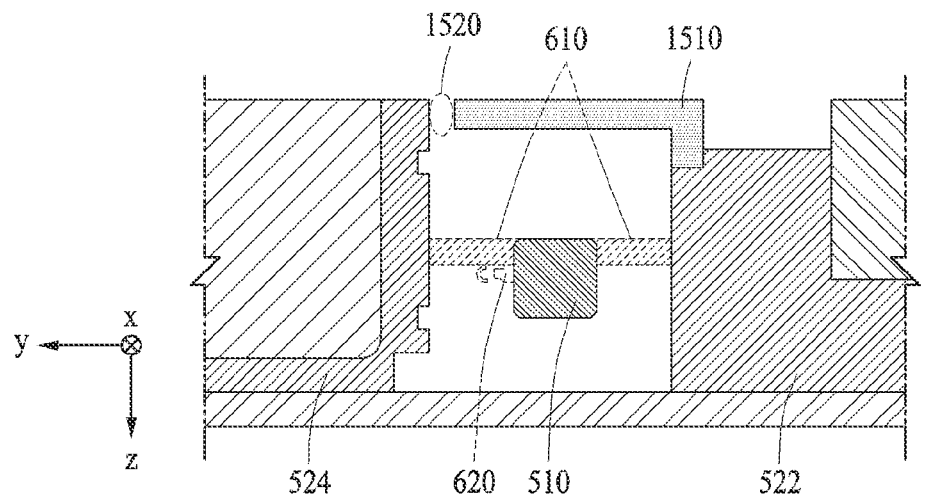
FIGS. 15, 16, and 17 are cross-sectional views of example antenna structures according to various embodiments.
Figure 16:
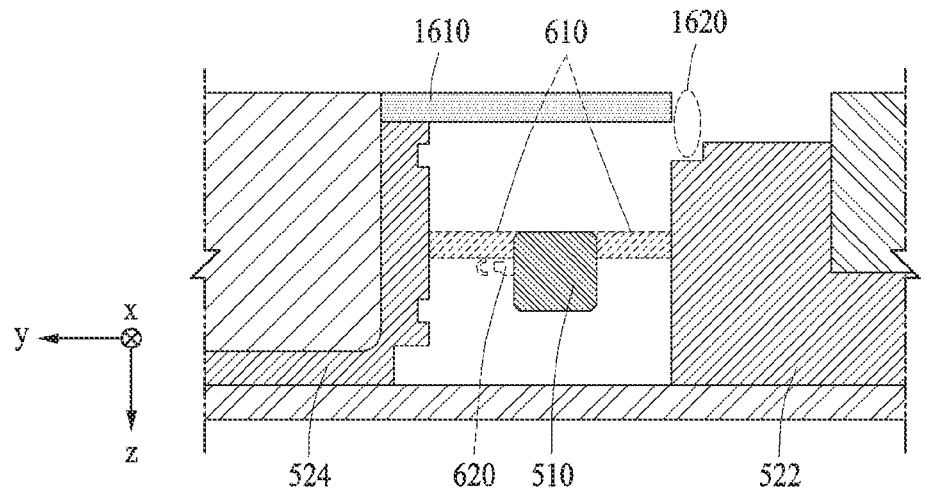
Figure 17:
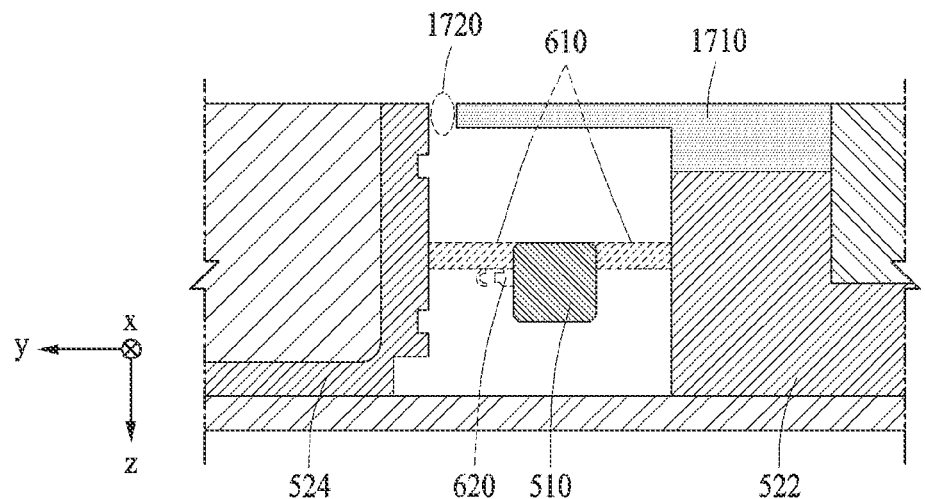

FIGS. 15, 16, and 17 are cross-sectional views of example antenna structures according to various embodiments.

FIG. 15 illustrates an antenna structure in which a metal plate 1510 is connected to the one end 522 of the second support structure 720 and is spaced apart by a gap 1520 from the other end 524 instead of being connected to the other end 524. FIG. 16 illustrates an antenna structure in which a metal plate 1610 is connected to the other end 524 of the second support structure 720 and is spaced apart from the one end 522 by a gap 1620. Similar to the antenna structure of FIG. 15, FIG. 17 illustrates an antenna structure in which a metal plate 1710 is connected to the one end 522 of the second support structure 720 and is spaced apart by a gap 1720 from the other end 524. The metal plate 1710 may be fixed to the second support structure 720 by a fixing member such as a screw at the one end 522 of the second support structure 720.

FIGS. 18, 19, 20, 21, 22, 23, 24, and 25 illustrate various example antenna structures as viewed in the z-axis direction according to various example embodiments.

Figure 18:
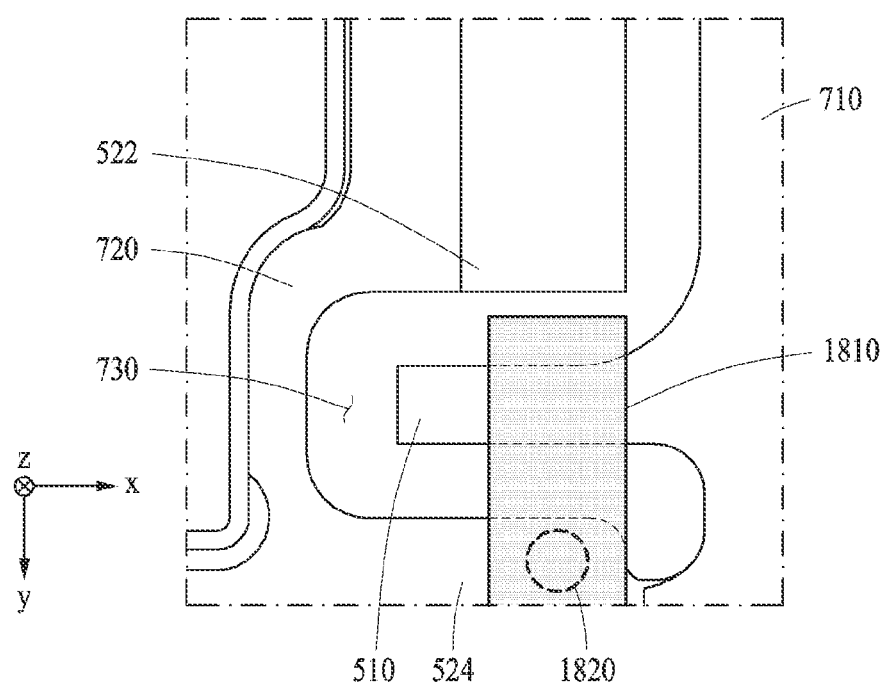
FIGS. 18, 19, 20, 21, 22, 23, 24, and 25 are diagrams illustrating example antenna structures, as viewed in the z-axis direction according to various embodiments.
Figure 19:
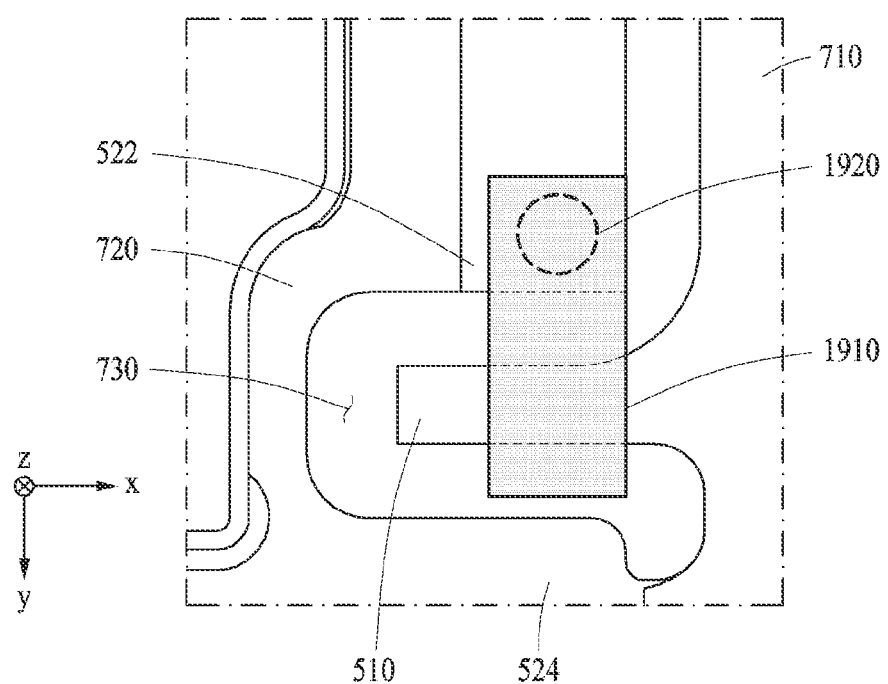

FIG. 18 illustrates an antenna structure in which a metal plate 1810, which is an independent metal member, is spaced apart from the one end 522 of the second support structure 720 and is connected to the other end 524 of the second support structure 720 in a region 1820. The metal plate 1810 may be fixed to the other end 524 by a fixing member such as a screw in the region 1820. FIG. 19 illustrates an antenna structure in which a metal plate 1910, which is an independent metal member, is spaced apart from the other end 524 of the second support structure 720 and is connected to the one end 522 in a region 1920. The antenna structures of FIGS. 18 and 19 may have structural advantages of reinforcing a mechanical rigidity of a peripheral region of the metal flange 510 in which the slit 730 is located, using the metal plates 1810 and 1910.

Figure 20:
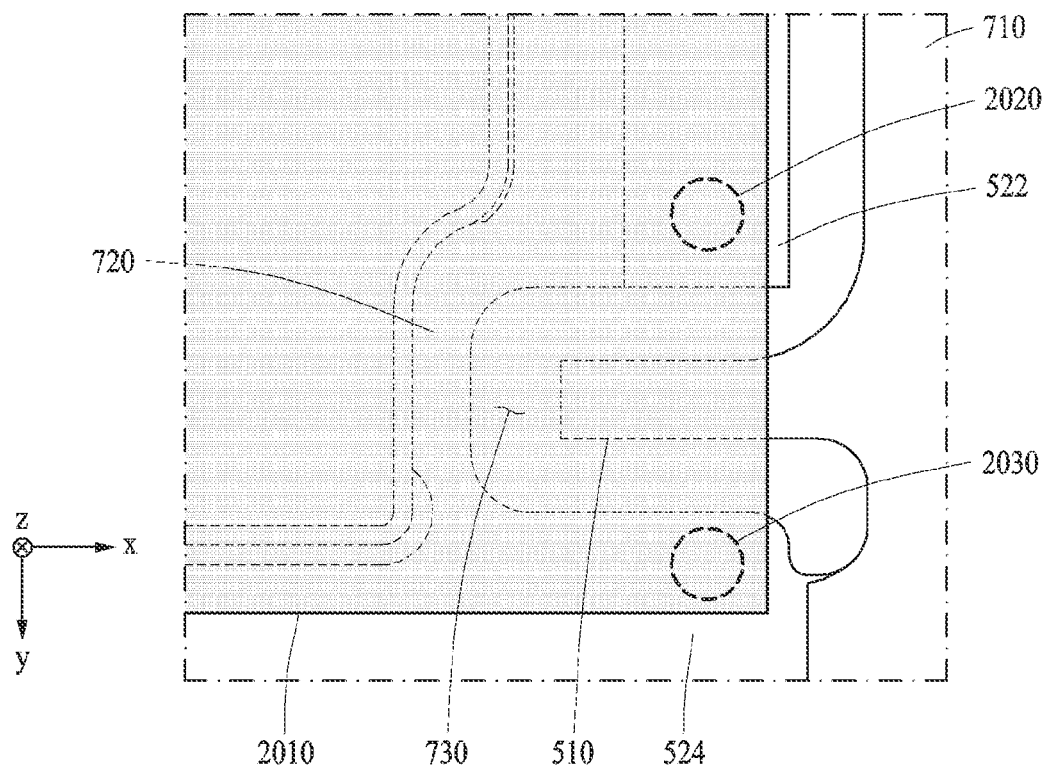

FIG. 20 illustrates an antenna structure in which a metal plate 2010 extends into the electronic device 101. The metal plate 2010 may overlap a region of the metal flange 510 and enclose at least a portion of the metal flange 510 together with a portion of the second support structure 720. The metal plate 2010 may extend above a circuit board (e.g., the circuit board 240 of FIG. 2) disposed inside the electronic device 101. An extended portion of the metal plate 2010 may function to protect the circuit board from an external force and to prevent and/or reduce (e.g., shield) external noise from being introduced. For example, the metal plate 2010 may correspond to a protection plate disposed on the circuit board. In this example, it may be understood that the protection plate extends to a slit antenna disposed on a side surface of the electronic device 101 to form a cavity structure around the metal flange 510. In an example, the metal plate 2010 may be fixed by a fixing member (e.g., any type of fastener) to the one end 522 of the second support structure 720 in a region 2020, and may be fixed by another fixing member to the other end 524 of the second support structure 720 in a region 2030. In another example, the metal plate 2010 may be fixed to the second support structure 720 in only one of the regions 2020 and 2030.

Figure 21:
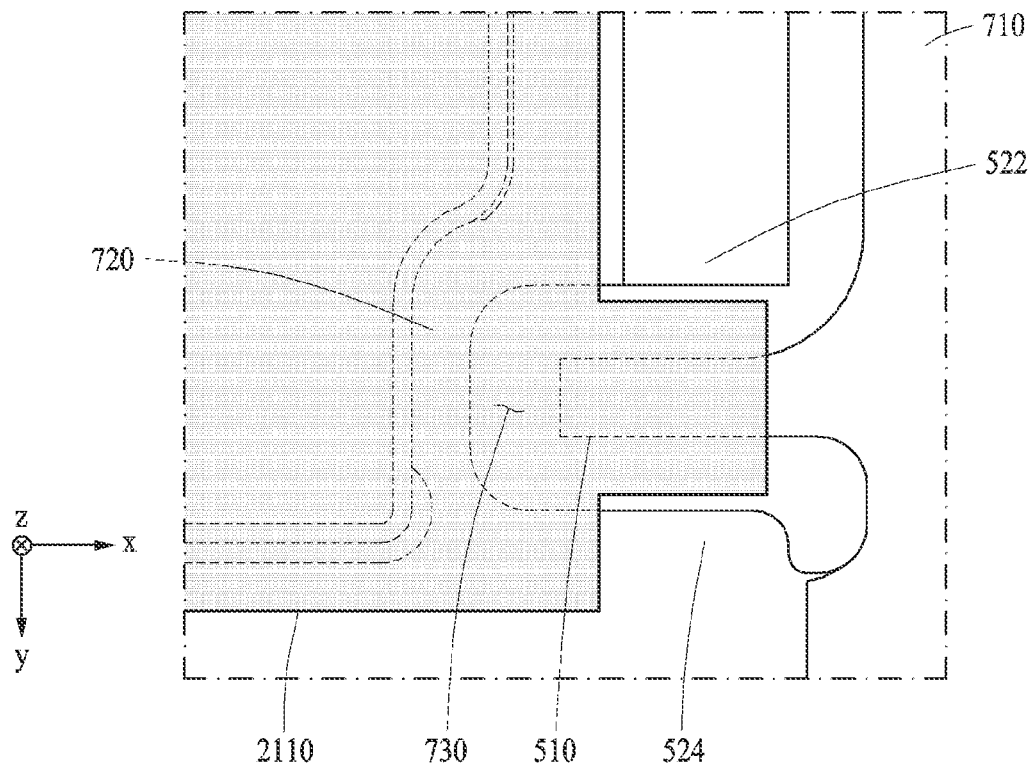

FIG. 21 illustrates an example in which a protection plate 2110 for protecting a circuit board extends to a slit antenna disposed on a side surface of the electronic device 101, instead of being physically connected to the first support structure 710 and the second support structure 720. An extended portion of the protection plate 2110 may overlap the metal flange 510.

Figure 22:
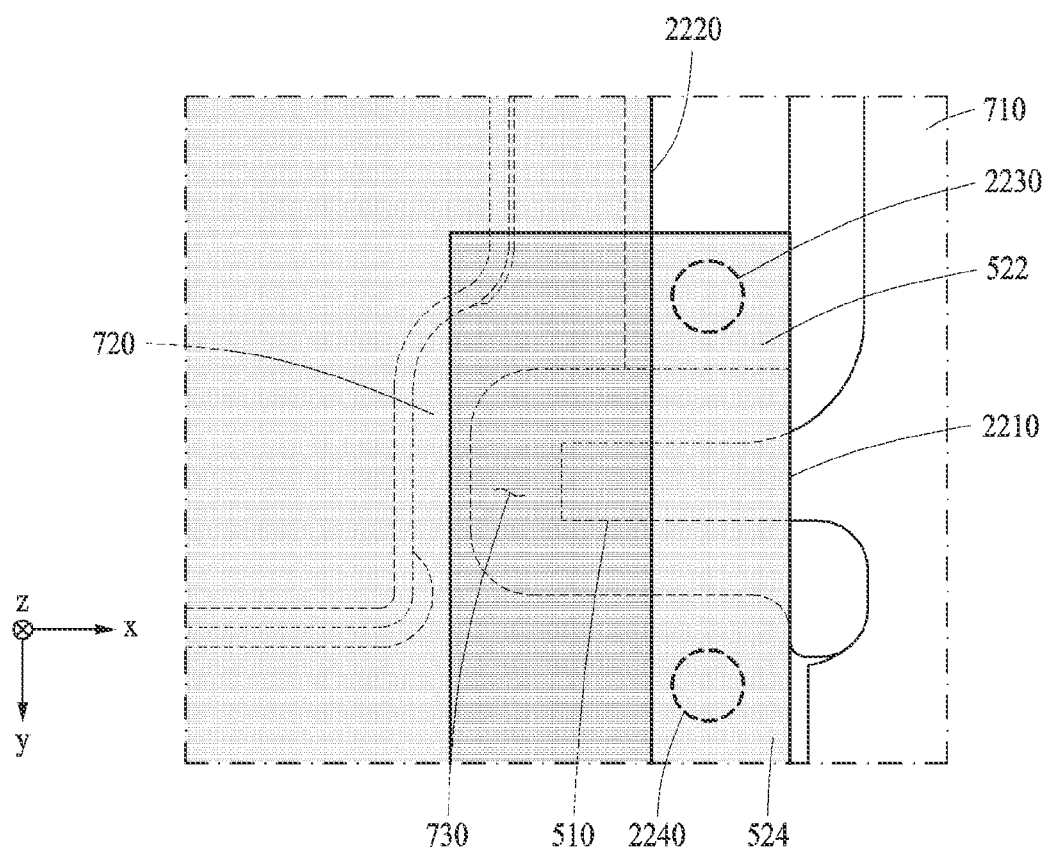

FIG. 22 illustrates an example in which a metal plate 2210 that is connected to the second support structure 720 and that overlaps the metal flange 510, and a protection plate 2220 for protecting a circuit board are separately disposed. The metal plate 2210 and the protection plate 2220 may overlap each other when viewed in one direction (e.g., a z-axis direction, or a direction oriented from the front side of the electronic device 101). The metal plate 2210 may be fixed by a fixing member to the one end 522 of the second support structure 720 in a region 2230, and may be fixed by another fixing member to the other end 524 of the second support structure 720 in a region 2240.

Figure 23:
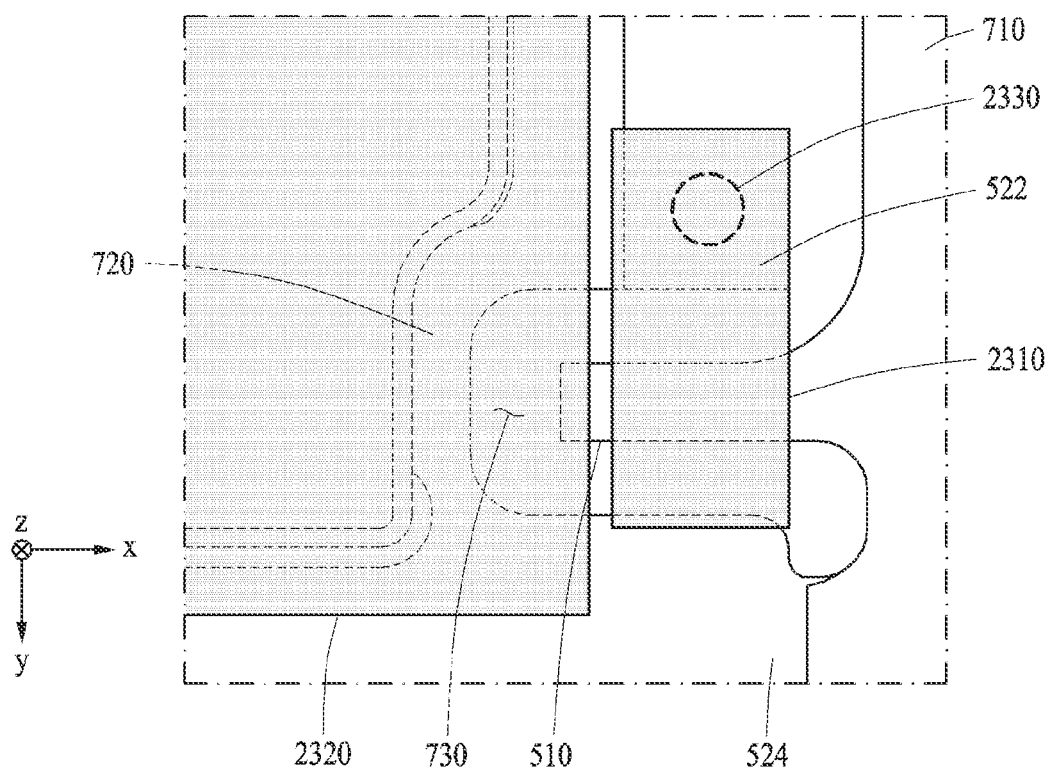
Figure 24:
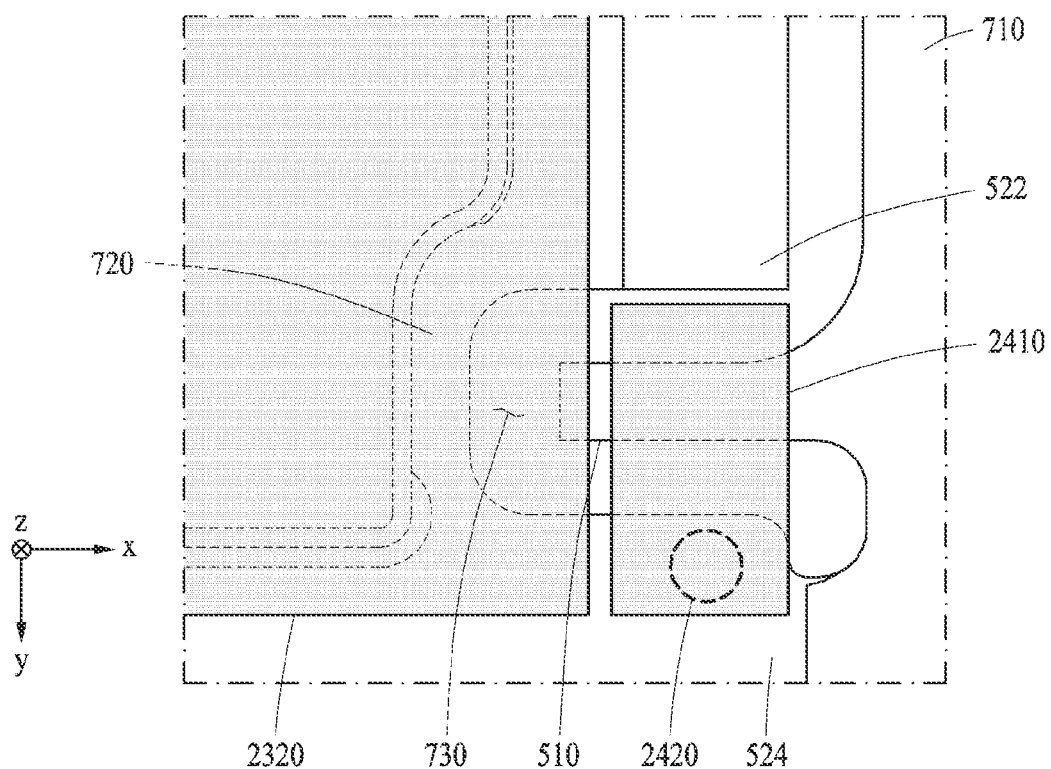
Figure 25:
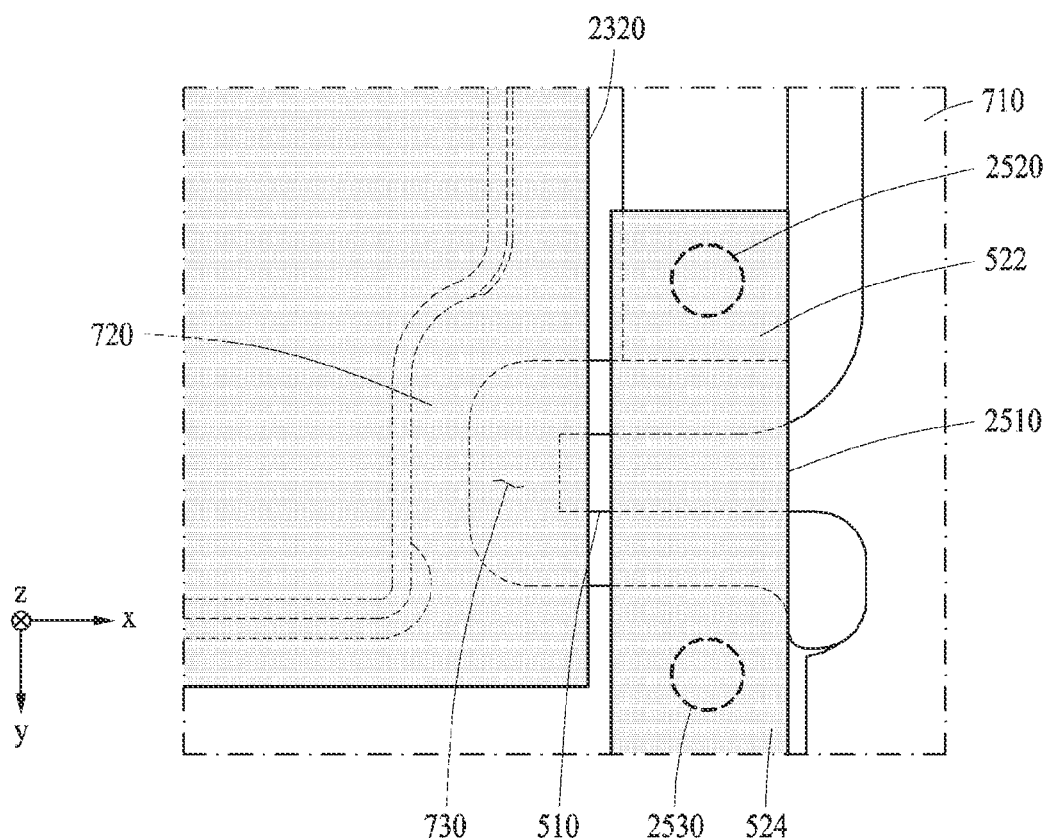

FIG. 23 illustrates an example in which a metal plate 2310 and a protection plate 2320 are separately disposed, instead of overlapping each other. The protection plate 2320 for protecting a circuit board may extend toward a slit antenna to overlap a portion of the slot 730. The metal plate 2310 may be connected to the one end 522, instead of the other end 524, of the second support structure 720. For example, the metal plate 2310 may be fixed to the one end 522 by a fixing member (e.g., a screw) in a region 2330. Referring to FIG. 24, a metal plate 2410 may be connected to the other end 524, instead of the one end 522, of the second support structure 720. The metal plate 2410 may be fixed to the other end 524 by a fixing member in a region 2420. Referring to FIG. 25, a metal plate 2510 may be connected to both the one end 522 and the other end 524 of the second support structure 720. The metal plate 2510 may be fixed to the one end 522 by a fixing member in a region 2520 and may be fixed to the other end 524 by the fixing member in a region 2530.

The electronic device 101 according to various example embodiments may be one of various types of electronic devices. The electronic device 101 may include, for example, a portable communication device (e.g., a smartphone, and a personal digital assistant (PDA)), a computer device, a portable multimedia device, a portable medical device, a camera, a wearable device, a home appliance device, or the like. According to example embodiments of the disclosure, the electronic device 101 is not limited to those described above.

It should be appreciated that various example embodiments of the present disclosure and the terms used therein are not intended to limit the technological features set forth herein to particular embodiments and include various changes, equivalents, or replacements for a corresponding embodiment. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A. B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various example embodiments of the disclosure, the term "module" may include a unit implemented in hardware, software, or firmware, or any combination thereof, and may interchangeably be used with other terms, for example, "logic," "logic block," "part." or "circuitry". A module may be a single integral component, or a minimum unit or part thereof, adapted to perform one or more functions. For example, according to an example embodiment, the module may be implemented in a form of an application-specific integrated circuit (ASIC).

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively, or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a wireless communication circuit disposed inside the electronic device;
   a support comprising a first support disposed on at least a portion of a side surface of the electronic device and a second support forming a space for mounting electronic parts of the electronic device;
   a metal flange located on a protrusion of the first support and electrically connected to the wireless communication circuit;
   a slit formed between a portion of the first support and a portion of the second support; and
   a metal plate connected to the second support to form a cavity around the metal flange.

2. The electronic device of claim 1, wherein the metal plate is spaced apart from the metal flange and overlaps the metal flange when viewed from a front side of the electronic device.

3. The electronic device of claim 1, wherein the metal plate is integrally formed with the second support structure.

4. The electronic device of claim 1, wherein the metal plate is connected to one end of the second support and another end of the second support.

5. The electronic device of claim 1, wherein
   one end of the metal plate is connected to the second support, and
   another end of the metal plate is spaced apart from the second support.

6. The electronic device of claim 1, wherein the metal plate is fixed to the second support by a screw.

7. The electronic device of claim 1, wherein at least a portion of the second support is disposed along at least a portion of the first support and is spaced apart from the first support with the slit interposed therebetween.

8. The electronic device of claim 1, wherein a feeding slot is disposed on the metal flange.

9. The electronic device of claim 8, wherein the metal plate extends above a circuit board disposed inside the electronic device.

10. The electronic device of claim 9, wherein one end of the metal plate is fixed to the second support.

11. The electronic device of claim 1, further comprising:
    a circuit board disposed on the second support; and
    a protection plate configured to protect the circuit board,
    wherein the metal plate and the protection plate overlap each other when viewed from a front side of the electronic device.

12. An electronic device comprising:
a display panel;
a wireless communication circuit disposed inside the electronic device;
a support comprising a first support disposed on at least a portion of a side surface of the electronic device and a second support forming a space for mounting electronic parts of the electronic device;
a metal flange located on a protrusion of the first support and electrically connected to the wireless communication circuit;
a circuit board disposed on the second support, the circuit board comprising the wireless communication circuit; and
a metal plate enclosing at least a portion of the metal flange together with a portion of the second support.

13. The electronic device of claim 12, wherein the metal plate is configured to shield at least a portion of electromagnetic waves radiated from a feeding slot of the metal flange toward the metal plate from leaking to an outside of the metal plate.

14. The electronic device of claim 12, wherein the metal plate is spaced apart from the metal flange and overlaps the metal flange when viewed from a front side of the electronic device.

15. The electronic device of claim 12, wherein the metal plate is connected to one end of the second support and another end of the second support.

16. The electronic device of claim 12, wherein
one end of the metal plate is connected to the second support, and
another end of the metal plate is spaced apart from the second support.

17. The electronic device of claim 12, wherein the metal plate extends above the circuit board and an extended portion of the metal plate protects the circuit board.

18. An electronic device comprising:
a wireless communication circuit disposed inside the electronic device;
a first support disposed on at least a portion of a side surface of the electronic device, the first support comprising at least one protrusion electrically connected to the wireless communication circuit;
a second support forming a space for mounting electronic parts of the electronic device;
a slit formed between a portion of the first support and a portion of the second support; and
a metal plate connected to the second support to form a cavity around the protrusion.

19. The electronic device of claim 18, wherein at least a portion of the second support is disposed along at least a portion of the first support and is spaced apart from the first support with the slit interposed therebetween.

* * * * *